United States Patent [19]
Fowler

[11] 3,906,483
[45] Sept. 16, 1975

[54] COMPASS DISPLAY CIRCUIT

[75] Inventor: John T. Fowler, Winthrop, Mass.

[73] Assignee: Arthur D. Little, Inc., Cambridge, Mass.

[22] Filed: Jan. 21, 1974

[21] Appl. No.: 434,793

[52] U.S. Cl. .................. 340/336; 33/363; 340/206
[51] Int. Cl.² ........................................... G09F 9/32
[58] Field of Search .............. 340/336, 206; 33/363

[56] References Cited
UNITED STATES PATENTS

| | | | |
|---|---|---|---|
| 3,206,719 | 9/1965 | Pure | 340/206 |
| 3,396,378 | 8/1968 | Keith, Jr. | 340/336 |
| 3,566,388 | 2/1971 | Andrews et al. | 340/336 |
| 3,766,535 | 10/1973 | Deebel et al. | 340/206 |

Primary Examiner—Marshall M. Curtis
Attorney, Agent, or Firm—Weingarten, Maxham & Schurgin

[57] ABSTRACT

For use with a digital magnetic compass providing a serial pulse train representative of compass heading, a display circuit for converting received pulse trains into parallel codes for driving a numerical indicator. The display circuit includes an internal clock for governing system timing and for selectively providing an output indication of elapsed time.

7 Claims, 2 Drawing Figures

3,906,483

COMPASS DISPLAY CIRCUIT

FIELD OF THE INVENTION

This invention relates to remote reading magnetic compasses and more particularly to a digital display circuit therfor.

BACKGROUND OF THE INVENTION

Remote reading magnetic compasses are known wherein an electrical signal representation of compass heading is provided and conveyed to one or more remote points for display or other utilization purposes such as in an automatic piloting system. The display typically includes a plurality of numerical indicators for providing an output display of compass heading. Preferably, such display should be of conveniently small size and include all necessary circuitry for easy installation in the wheelhouse, cockpit or other location aboard a vessel on which the compass is installed. A particularly effective remote reading compass is shown in copending patent application Ser. No. 279,723, filed Aug. 10, 1972, entitled DIGITAL COMPASS, and in U.S. Pat. No. 3,833,901, issued Sept. 3, 1974, entitled MAGNETIC COMPASS HAVING REMOTE DIGITAL READ-OUT, both assigned to the same assignee as this application, in which a compass card includes a plurality of optically coded tracks which are photoelectrically sensed to provide an electrical signal representation of compass heading and which is electronically processed to provide a digital pulse train adapted for serial transmission to a remote utilization point. The display of the present invention is especially adapted for receipt of such serial pulse train and for the provision of a numerical indication of compass heading represented thereby.

SUMMARY OF THE INVENTION

Briefly, the invention provides a digital display circuit for use with a remote reading magnetic compass and including all circuitry necessary for providing numerical indication of compass heading in response to a received pulse train and for alternatively providing elapsed time indications in response to an internal clock source. The display includes a crystal controlled oscillator which serves as an internal clock, a divider circuit providing timing signals of selected different frequencies, and decoding circuitry for converting received serial pulse trains from a remote reading compass into parallel codes for actuating associated numerical display indicators. The circuitry also includes means for eliminating contact bounce noise when switching between various operative modes, a regulated internal power supply, and means for synchronizing received pulses with the internal clock.

DESCRIPTION OF THE DRAWING

The invention will be more fully understood from the following detailed description taken in conjunction with the accompanying drawing, in which.

DETAILED DESCRIPTION OF THE INVENTION

The compass display circuit embodying the invention is operative in response to a serial pulse train representing compass heading to provide a numerical output indication of such heading as well as to provide a numerical output indication of elapsed time. In the illustrated embodiment, the received pulse train provided by a digital compass is a series of pulses of a number one more than the represented compass heading. Thus, a compass heading, for example, of 46° would be represented by a serial pulse train of 47 pulses. The initial pulse of the pulse train is employed to reset the display circuitry for subsequent processing of the remaining pulses of the received train.

Figure 1:
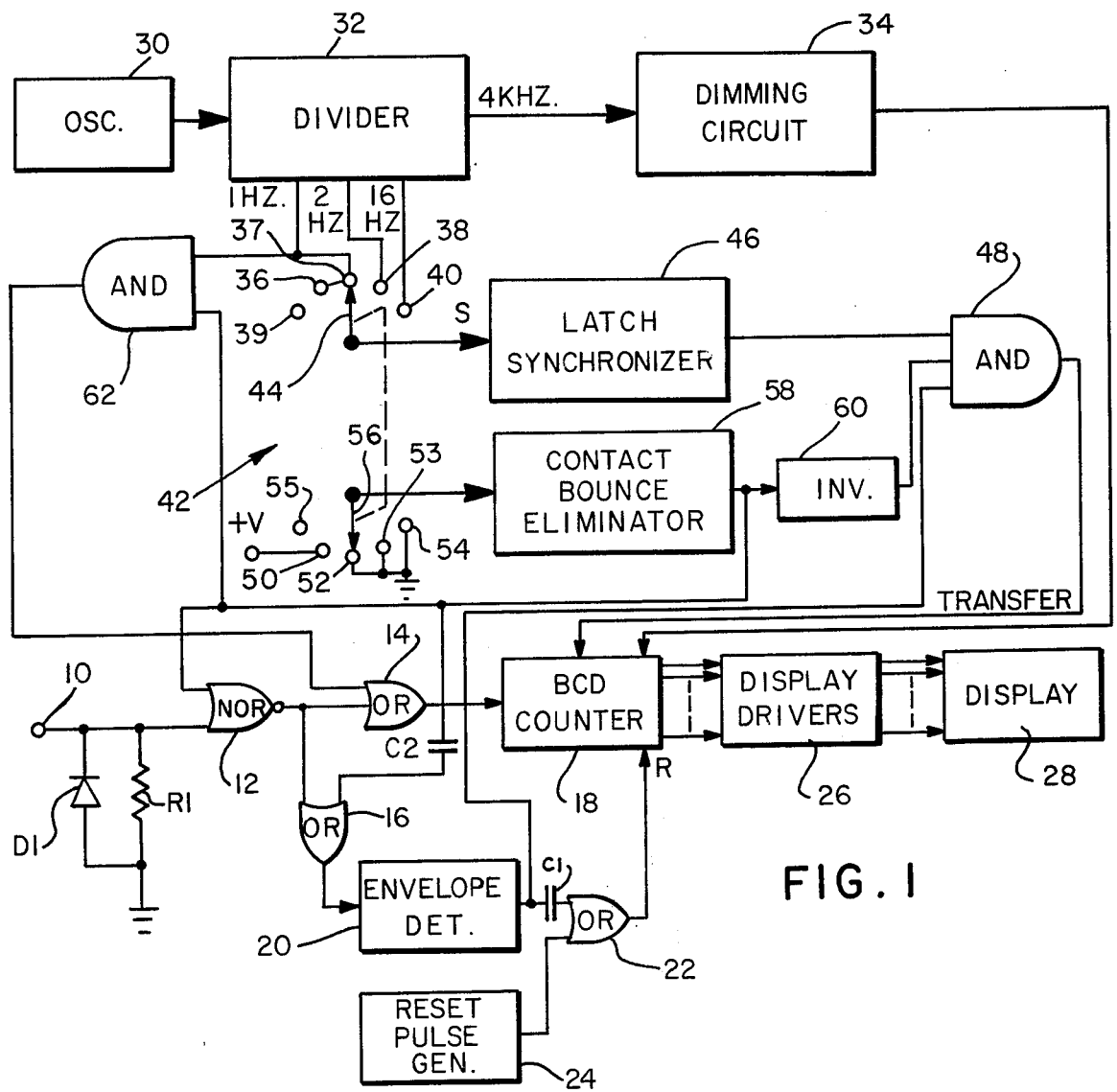
FIG. 1 is a combined schematic and block diagram of a compass display circuit according to the invention.

Referring now to FIG. 1, pulses from a digital compass, such as that shown in the aforesaid copending application, are applied to an input terminal 10 and thence to one input of a NOR gate 12, the output of which is applied to respective inputs of OR gates 14 and 16. A resistor R1 is connected between the input line and a source of reference potential, such as ground, with a diode D1 connected in the polarity shown across resistor R1 to serve as a filter for purposes of minimizing the effects of high frequency pulses which may be present as noise in the received pulse signal. The output of OR gate 14 is coupled to the input of a BCD counter 18, while the output of gate 16 is coupled to the input of an envelope detector 20. The envelope detector 20 provides a gating signal via a capacitor C1 to an OR gate 22 which also receives a reset signal from a reset pulse generator 24, the output of gate 22 providing a reset pulse to counter 18. The gating signal provided by envelope detector 20 is of a duration equal to the duration of the received pulse train. Pulse generator 24 provides a reset pulse to counter 18 upon initial energization of the display circuitry to condition the counter for processing of received pulses. The BCD counter 18 provides a multiple bit parallel code to display driver 26 which is operative to provide appropriately coded parallel output signals to display 28 which includes numerical indicators providing an output indication of compass heading or elapsed time. Display 28 can be, for example, a segmented digital display, such as a Sperry SP 353 three digit, seven segment gas discharge display. Driver 26 is usually included as part of the display assembly, and provides the necessary conversion circuitry for providing energization of the digit segments in response to a received BCD code from counter 18.

Master timing for the display is provided by a crystal oscillator 30, typically operative at a frequency of 16.384 KHz, which provides a clock train to a divider 32 operative to provide respective clock outputs of 1 Hz, 2 Hz, 16 Hz and 4 Khz on respective clock output lines. The 4 KHz clock signal is applied to a dimmer circuit 34, the output of which is applied as a blanking signal to counter 18. The dimmer circuit is operative to provide signals to the counter of a pulse width variable in response to a manual control, thereby to control the intensity of the displayed digits by adjusting the blanking rate of counter 18. The 1, 2 and 16 Hz clock pulses are applied to respective terminals 36, 37, 38 and 40 of one section of a ganged two-section rotary switch 42. The wiper arm 44 of switch 42 is connected to the set input of a latch circuit 46, the output of which is applied to one input of an AND gate 48.

The output of AND gate 48 is applied as a transfer signal to counter 18, and also as a reset signal to latch 46. The contact 50 of the second section of switch 42 is connected to a source (+ V) of positive potential, while contacts 52, 53, and 54 are connected to ground or other reference potential. The wiper arm 56 of the second switch section is connected to a contact bounce elimination circuit 58, the output of which is applied via an inverting circuit 60 to an input of AND gate 48. The output signal from circuit 58 is also applied via a capacitor C2 to an input of OR gate 16. The third input to AND gate 48 is provided by the gating signal from envelope detector 20. The 1 Hz clock signal is also applied to one input of an AND gate 62, the other input of which is provided from the output of contact bounce elimination circuit 58, which also applied an input signal to NOR gate 12. The output of gate 62 is applied as an input to OR gate 14.

The switch 42 is operative in one position, with arm 44 engaging contact 36 and arm 56 engaging contact 50, to provide 1 Hz clock pulses to counter 18 to provide an indication on display 28 of elapsed time in one second intervals. During this mode of operation, 1 Hz pulses from divider 32 are conveyed via AND gate 62 and OR gate 14 to the input of counter 18. An enable signal is provided to gate 62 by circuit 58, this signal being also AC coupled via capacitor C2 to gate 16 to inhibit envelope detector 20, and to gate 12 to inhibit transfer of a received pulse train. With switch 42 in the other positions, that is, with arm 44 engaging contacts 37, 38 or 40 and arm 56 engaging corresponding contacts 52, 53 or 54, received pulses from the digital compass are processed for display at the clock rate determined by the switch setting, that is, at a 1, 2 or 16 Hz rate. The particular clock rate in effect determines the delay between the received pulses and the display represented thereby, and thus provides electronic damping.

Circuit 58 provides an inhibit signal to envelope detector 20 to cause resetting of the display in the presence of transient signals which may be caused by contact bounce which can result during operation of switch 42. By operation of circuit 58, such spurious signals have no effect on system processing and are not erroneously processed as data pulses. The latch circuit 46 is operative to synchronize received data with the clock. The 1, 2 or 16 Hz clock pulses are conveyed by the latch to one input of AND gate 48, which also receives an input from inverter 60 and a third input from envelope detector 20. The clock signal is transmitted as a transfer signal to counter 18.

In operation, with switch arm 44 in engagement with switch contacts 37, 38 or 40 and switch arm 56 in engagement with contacts 52, 53 or 54, a serial pulse train received at input terminal 10 is applied to counter 18 which is incremented at the clock rate determined by the particular timing pulses being applied from divider 32. The initial pulse of a received train causes envelope detector 20 and capacitor C1 to provide via OR gate 22 a reset pulse to counter 18 to condition the counter for counting of subsequent pulses of a received pulse train. The counter is incremented to provide a binary coded decimal (BCD) output signal representative of the number of pulses in the received pulse train and which number, in turn, is representative of compass heading. Display drivers 26 are operative to provide in response to the BCD code appropriate driving signals for energizing the digit indicators of display 28 and thereby providing visual indication of compass headings in numerical form. Upon termination of the last received pulse of a pulse train, the gating signal from envelope detector 20 also terminates to permit the provision of a transfer signal from gate 48 to counter 18 to thereby cause display of compass heading represented by the then count in counter 18.

In order to provide an output indication of elapsed time, switch arm 44 is set to engage switch contact 36, while switch arm 56 engages contact 50. Clock pulses at a frequency of 1 Hz are applied via gate 14 to counter 18 to provide parallel output signals for causing display of a numerical indication of elapsed time at a 1-second rate.

Figure 2:
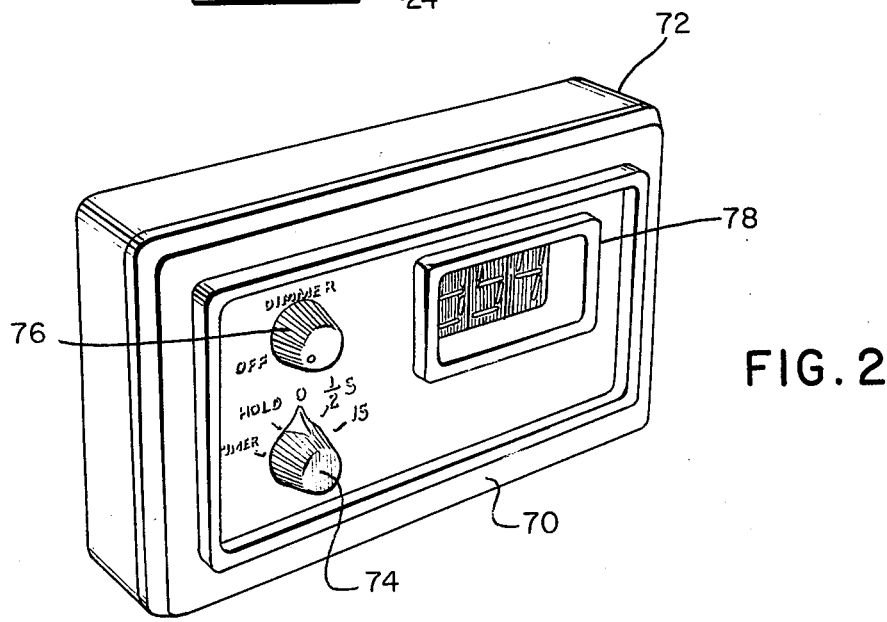
FIG. 2 is a pictorial view of a housing containing the novel compass display circuit.

The display circuit is typically contained within a small housing illustrated in FIG. 2, which also includes associated controls and indicators. Referring to FIG. 2, there is provided on the front panel 70 of housing 72 a control knob 74 coupled to switch 42 and which is rotatable to switch positions labelled TIMER, HOLD, 0, ½ S and 1S. A control knob 76 is coupled to a potentiometer which is part of dimming circuit 34 for control of the intensity of the visual display. An array of three numerical indicators 78 is provided for display of compass heading or elapsed time, as desired. The housing 72 also includes a power supply associated with the display circuit and which preferably is a well regulated, low dissipation supply, such as a switching regulator, providing substantially constant output voltage for energization of the display circuitry. The position of switch 74 labelled TIMER is the position with switch arms 44 and 56 in respective contact with contacts 36 and 50 to provide 1-second timing indications. The HOLD position is provided by the switch arms in engagement with unconnected switch contacts 49 and 55, in which position no input signal is applied to latch synchronizer 46, and thus no data is shifted out to the display. As a result, the display continues to show the last loaded data before switch 74 was turned to the HOLD position. The switch position labelled ZERO, ½ S and 1S represent a delay of about zero, one-half second and 1 second provided respectively by the timing pulses at the frequencies of 16, 2 and 1 Hz.

The invention is not to be limited to the specific embodiment shown and described except as indicated in the appended claims.

What is claimed is:

1. For use with a digital magnetic compass providing a serial pulse train representative of compass heading, display circuitry for converting received serial pulses to a parallel form for driving output indicators for selective numerical display of compass heading and elapsed time, said circuitry comprising:

a clock source providing clock pulses at a predetermined frequency;

a divider circuit operative in response to said clock pulses for providing a plurality of timing pulse trains of respective different frequencies;

means for receiving said serial pulses from a digital magnetic compass;

envelope detector means operative to provide a gating signal of a duration corresponding to the duration of said received serial pulses;

counter means operative in response to said received serial pulses and said gating signal to provide parallel output signals representative of magnetic compass heading;

selector means operative to select one of said timing pulse trains;

a dimmer circuit operative in response to one of said timing pulse trains to provide output signals of selectable pulse width and coupled to said counter means for control of the blanking rate thereof;

synchronizing means coupled to said counter means and operative in response to one of said timing pulse trains to synchronize processing of said received serial pulses and timing pulse trains;

means coupled to said selector means and to said envelope detector means for inhibiting signal processing in the presence of contact bounce noise;

means operative in response to one of said timing pulse trains for providing said selected pulse train to said counter means to the exclusion of said received serial pulses to cause provision by said counter means of parallel output signals representative of elapsed time; and display means operative in response to said parallel output signals for providing a numerical indication of compass heading or elapsed time.

2. The invention according to claim 1 wherein said means for receiving said serial pulses includes filter means for minimizing high frequency noise which may be present in the received signal.

3. The invention according to claim 1 wherein said selector means includes a two section switch, one section being connected to said divider circuit for selecting one of said timing pulse trains, the other section being connected to said contact bounce inhibiting means.

4. The invention according to claim 1 wherein said means for inhibiting signal processing in the presence of contact bounce noise includes:

a contact bounce elimination circuit operative to provide an inhibit signal in the presence of transient signals caused by contact bounce noise from said selector means;

gating means operative to convey said inhibit signal to said envelope detector means for resetting thereof; and capacitor means coupling said contact bounce elimination circuit and said gating means.

5. The invention according to claim 1 wherein said synchronizing means includes:

a synchronizing circuit receiving one of said timing pulse trains selected by said selector means; and an AND gate receiving timing signals from said synchronizing circuit and said gating signal from said envelope detector means and providing a transfer signal to said counter means.

6. The invention according to claim 1 wherein said envelope detector means includes:

an envelope detector circuit;

a gate circuit;

a capacitor coupling the output of said envelope detector circuit to the input of said gate circuit;

the output of said gate circuit being coupled to the reset terminal of said counter means;

said gate circuit providing a reset signal to said counter means at the termination of said gating signal.

7. For use with a digital magnetic compass providing a serial pulse train representative of compass heading, display circuitry for converting received serial pulses to parallel form for driving output indicators for numerical display of compass heading, said circuitry comprising:

means for receiving serial pulses from a digital magnetic compass of a number representing compass heading;

envelope detector means operative to provide a gating signal of a duration corresponding to the duration of said received serial pulses;

counter means operative in response to said received serial pulses and said gating signal to provide parallel output signals representative of magnetic compass heading; and display means operative in response to said parallel output signals to provide a numerical indication of compass heading represented by the number of said received serial pulses.

* * * * *